United States Patent
Palmer et al.

(10) Patent No.: US 12,119,634 B2
(45) Date of Patent: *Oct. 15, 2024

(54) CLAMP FOR SUSPENDING WIRE

(71) Applicant: PREFORMED LINE PRODUCTS CO., Mayfield Village, OH (US)

(72) Inventors: Jacob Jeffrey Palmer, Chesterland, OH (US); Benjamin Franklin Ciesielczyk, Madison, OH (US); Cameron Clines, Chagrin Falls, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,642

(22) Filed: Jun. 12, 2023

(65) Prior Publication Data
US 2024/0120724 A1  Apr. 11, 2024

Related U.S. Application Data

(63) Continuation of application No. 17/290,475, filed as application No. PCT/US2018/058396 on Oct. 31, 2018, now Pat. No. 11,677,228.

(51) Int. Cl.
*H02G 7/05* (2006.01)
(52) U.S. Cl.
CPC .................... *H02G 7/053* (2013.01)
(58) Field of Classification Search
CPC ................. H02G 7/053; H02G 7/05
USPC ............................. 248/63; 174/42
See application file for complete search history.

(56) References Cited

U.S. PATENT DOCUMENTS

| | | | | |
|---|---|---|---|---|
| 2,884,476 | A * | 4/1959 | Lock | F16G 11/06 |
| | | | | 174/79 |
| 3,274,654 | A * | 9/1966 | Becker | H02G 7/056 |
| | | | | 403/287 |
| 4,383,668 | A * | 5/1983 | Hall | F16G 11/06 |
| | | | | 174/42 |
| 4,719,672 | A * | 1/1988 | Apperson | G02B 6/48 |
| | | | | 24/135 R |
| 5,752,680 | A * | 5/1998 | Mann | H02G 7/056 |
| | | | | 248/65 |
| 11,677,228 | B2 * | 6/2023 | Palmer | H02G 7/053 |
| | | | | 248/63 |

* cited by examiner

*Primary Examiner* — Todd M Epps
(74) *Attorney, Agent, or Firm* — Cooper Legal Group, LLC

(57) ABSTRACT

A clamp for suspending a wire includes a housing having an inner support surface. The wire is disposed between the inner support surface and a keeper. The clamp further includes a fastening unit, including a first fastener and a second fastener attachable to the first fastener. The housing defines an opening extending in a direction along which the wire is received within the housing. After the second fastener is attached to the first fastener, the fastening unit is not removable from the housing. The fastening unit is movable, within the opening, between a first position and a second position. In the first position, the fastening unit cooperates with the keeper to decrease a distance between the inner support surface and the keeper. In the second position, the fastening unit does not cooperate with the keeper to decrease the distance.

20 Claims, 16 Drawing Sheets

CLAMP FOR SUSPENDING WIRE

CROSS-REFERENCE TO RELATED APPLICATIONS

This application claims priority to PCT application PCT/US2018/058396, WO2020091754 filed on Oct. 31, 2018, and U.S. patent application Ser. No. 17/290,475 filed on Apr. 30, 2021, both titled "CLAMP FOR SUSPENDING WIRE" which are incorporated herein by reference.

TECHNICAL FIELD

The instant application is directed towards a support structure. For example, the instant application is directed towards a support structure for supporting a wire.

BACKGROUND

Support structures may be used for supporting a wire, or the like. The wire, etc. may be at least partially surrounded by the support structure.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a clamp for suspending a wire includes a housing, and the wire rests on an inner support surface of the housing when the wire is suspended by the clamp. The clamp also includes a keeper. The wire is disposed between the inner support surface and the keeper when the wire is suspended by the clamp. The clamp further includes a fastening unit, including a first fastener and a second fastener attachable to the first fastener. The housing defines an opening extending in a direction along which the wire is received within the housing. After the second fastener is attached to the first fastener, the fastening unit is movable, within the opening, between a first position relative to the housing and a second position relative to the housing. When the fastening unit is located at the first position, the fastening unit cooperates with the keeper to decrease a distance between the inner support surface and the keeper to facilitate the keeper maintaining the wire within the clamp. When the fastening unit is located at the second position, the fastening unit does not cooperate with the keeper to decrease the distance.

In an example, a clamp for suspending a wire includes a housing, and the wire rests on an inner support surface of the housing when the wire is suspended by the clamp. The clamp also includes a keeper. The wire is disposed between the inner support surface and the keeper when the wire is suspended by the clamp. The clamp further includes a fastening unit that includes a first fastener and a second fastener attachable to the first fastener. The housing defines an opening. The keeper defines a second opening to receive the first fastener. When the first fastener is received within the second opening, the fastening unit cooperates with the keeper to decrease a distance between the inner support surface and the keeper to facilitate the keeper maintaining the wire within the clamp. The keeper is detachable from the fastening unit before the second fastener is attached to the first fastener and the keeper is detachable from the fastening unit after the second fastener is attached to the first fastener.

In an example, a clamp for suspending a wire includes a housing, and the wire rests on an inner support surface of the housing when the wire is suspended by the clamp. The clamp also includes a keeper, and the wire is disposed between the inner support surface and the keeper when the wire is suspended by the clamp. The clamp further includes a fastening unit that includes a first fastener and a second fastener attachable to the first fastener. The first fastener is attached to at least one of the housing or the keeper when the second fastener is attached to the first fastener. The first fastener is attached to at least one of the housing or the keeper when the second fastener is not attached to the first fastener. The second fastener is attached to at least one of the keeper or the housing when the second fastener is attached to the first fastener. The second fastener is attached to at least one of the keeper or the housing when the second fastener is not attached to the first fastener. The fastening unit cooperates with the keeper to decrease a distance between the inner support surface and the keeper to facilitate the keeper maintaining the wire within the clamp.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
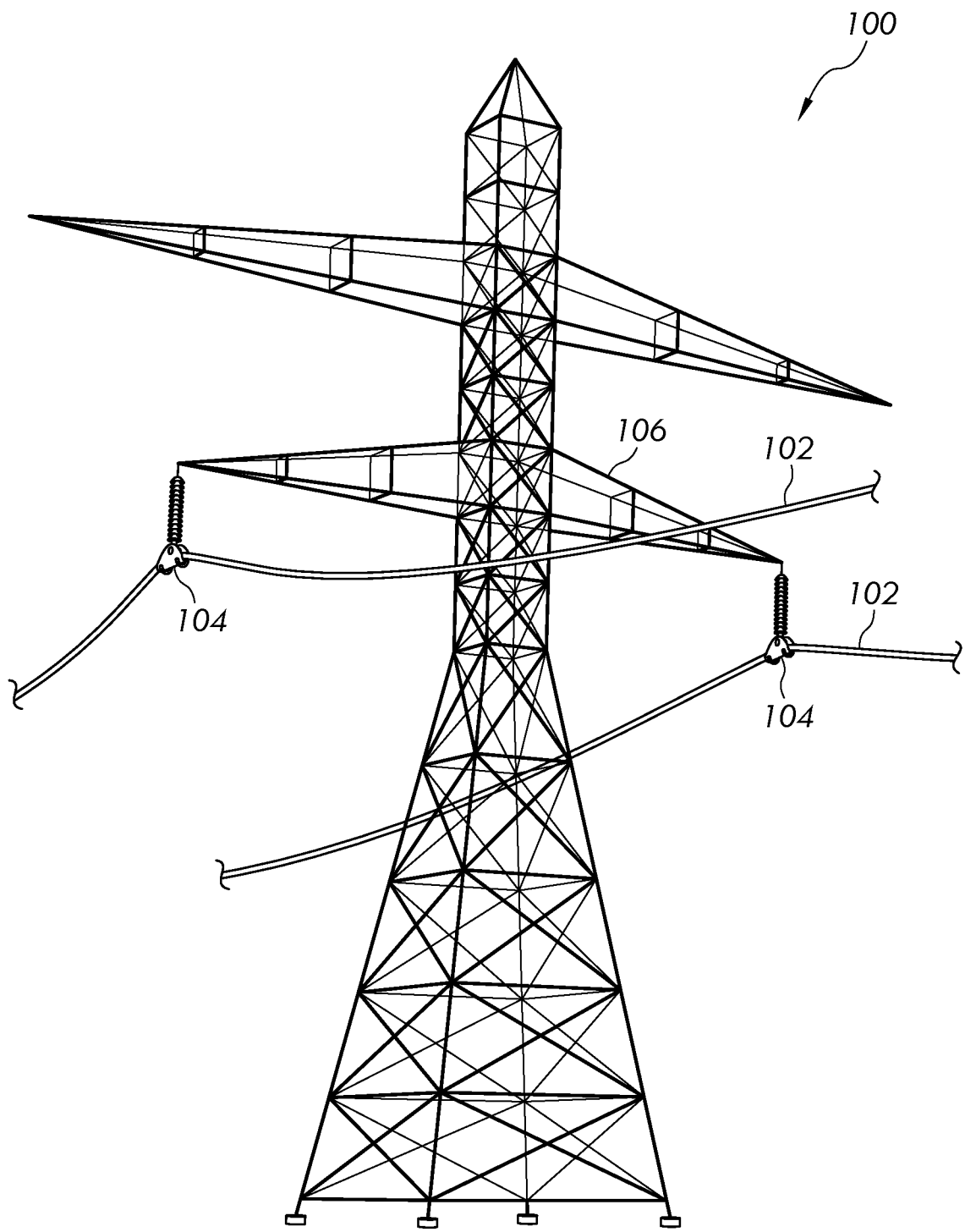
FIG. 1 is an illustration of an example clamp for supporting a wire.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Turning to FIG. 1, an example overhead power line environment 100 is illustrated. The overhead power line environment 100 comprises any number of structures, configurations, constructions, etc., some of which may be described and/or illustrated with respect to FIGS. 1 to 17. In an example, the overhead power line environment 100 may be used in association with electric power transmission and/or distribution. One or more conductors may be suspended by a tower, pole, or the like.

The overhead power line environment 100 comprises a wire 102. For the purposes of this disclosure, the term "wire" can include, but is not limited to, mono-filament wire, stranded wire, multiple wires, fiber optic cable, overhead shielded wire, conductors, optical ground wire (OPGW), and all-dielectric self-supporting fiber optic cable (ADSS). In some examples, the wire 102 is an electrically conductive wire that may transmit electrical energy through the wire 102. The wire 102 may comprise a metal material that is electrically conductive. The wire 102 may extend between towers, poles, or the like and, in the illustrated example, may be supported at a distance above the ground (e.g., overhead).

The overhead power line environment 100 includes a clamp 104 for suspending the wire 102. It will be appreciated that the example of FIG. 1 illustrates an exemplary clamp 104. However, in other examples, the clamp 104 is not limited to the illustrated size, shape, construction, design, etc. Rather, the clamp 104 includes any number of constructions, some of which may be used to support a structure (e.g., the wire 102, etc.) at a distance above the ground with respect to a tower, pole, or the like. The clamp 104 may include a support surface, one or more fasteners, etc. The clamp 104 may be directly or indirectly attached to a tower 106, pole, or the like.

Figure 2:
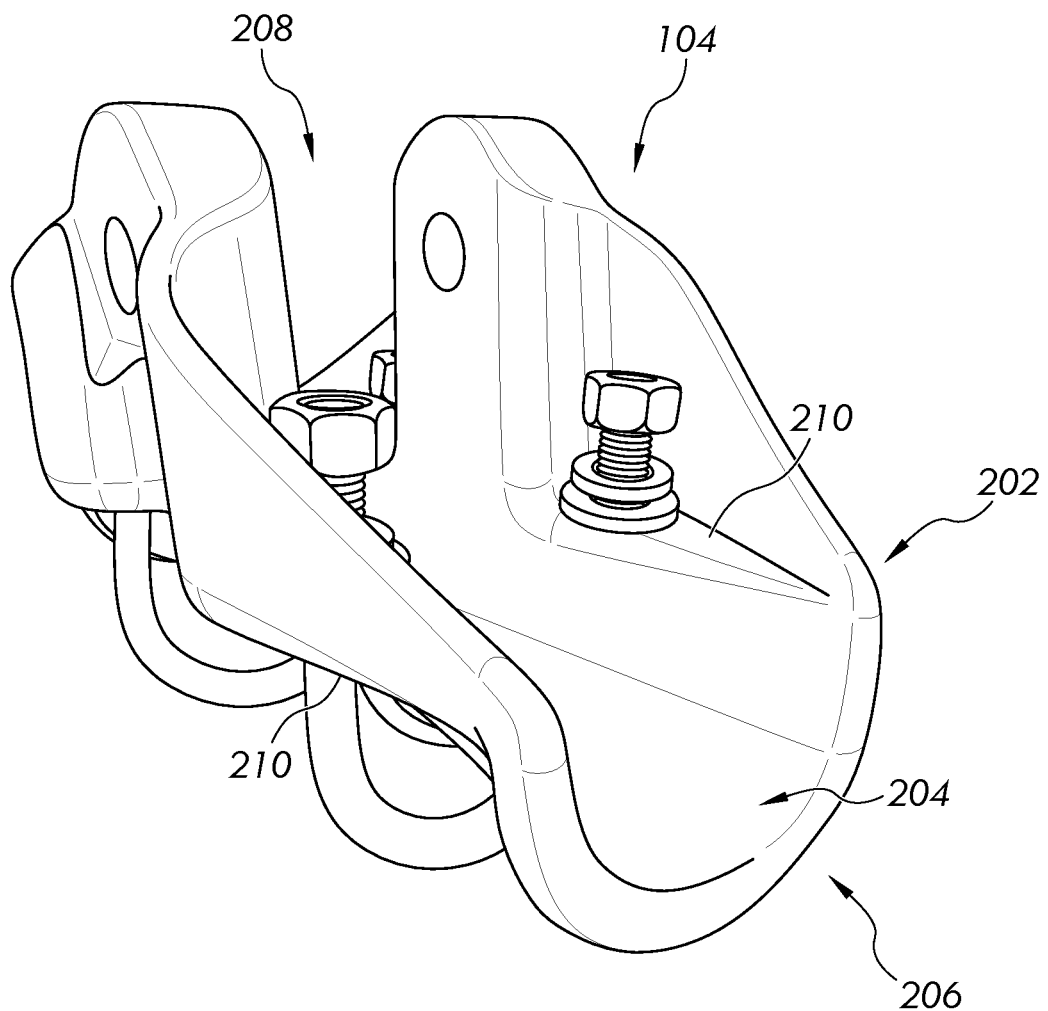
FIG. 2 is an illustration of an example clamp.

Referring to FIG. 2, a perspective view of an example clamp 104 is shown. The overhead power line environment 100 comprises a clamp 104 for supporting the wire 102. As such, the clamp 104 may support (e.g., hold, grip, etc.) the wire 102 and maintain a tension in the wire 102 without damaging an outer sheath of the wire 102, if the wire 102 includes a sheath. With the clamp 104 supporting the wire 102, the wire 102 may be supported above a surface such as the ground, roads or other objects.

The clamp 104 is illustrated in association with the wire 102. It will be appreciated that in the illustrated example, a portion of the wire 102 is illustrated. In operation, however, the wire 102 may extend a longer or shorter distance than as illustrated, such as by extending in a similar manner as illustrated in FIG. 1.

The clamp 104 includes a housing 202, wherein the wire 102 rests on an inner support surface 204 of the housing 202. The housing 202 can define a wire receiving region 206. While generally open at an upper side 208 in order to facilitate the placement of the wire 102 within the clamp, the bottom of the wire receiving region 206 is defined by the inner support surface 204 that can include a radius or other curved surface. The radius or other curved surface can help ensure that the inner support surface 204 provides a relatively large area of surface contact with the wire 102. Generally vertical walls 210 rising from the inner support surface 204 can define the sides of the wire receiving region 206. It is to be appreciated that the description of the wire 102 resting on the inner support surface 204 is contemplated to include gaskets, linings, inserts, armor rods, etc. that may be physically present between the wire 102 and the inner support surface 204.

Figure 3:
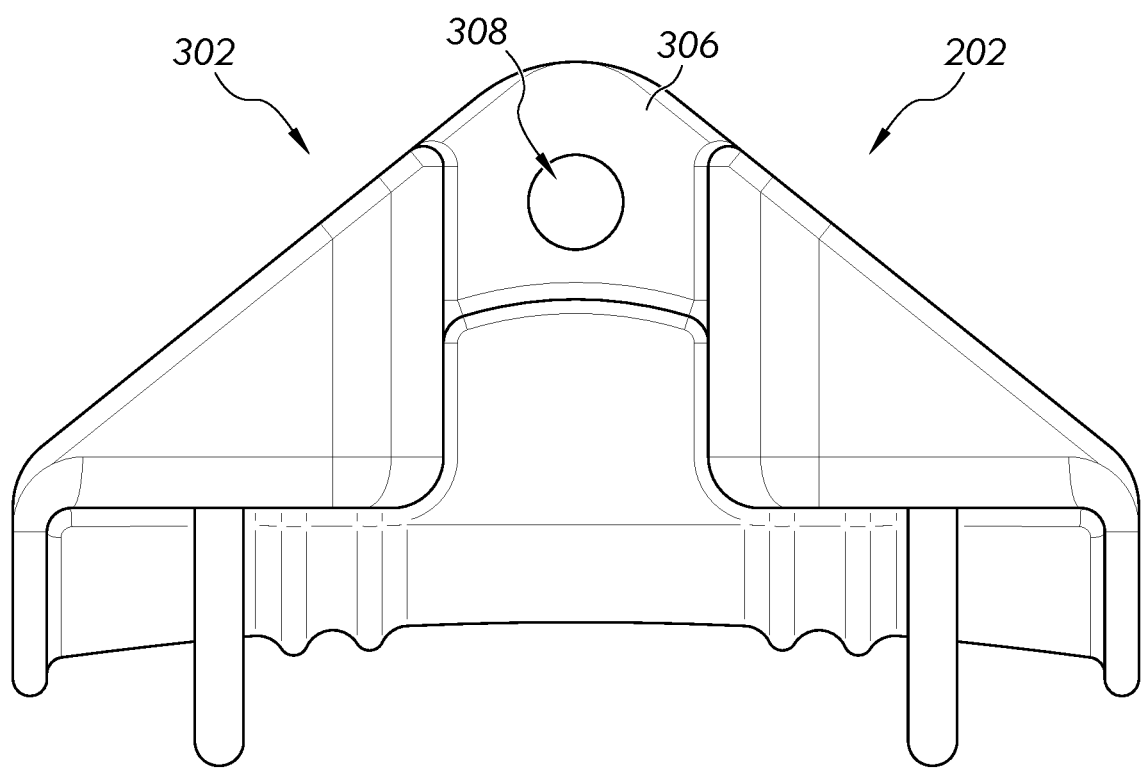
FIG. 3 is an illustration of an example clamp.
Figure 13:
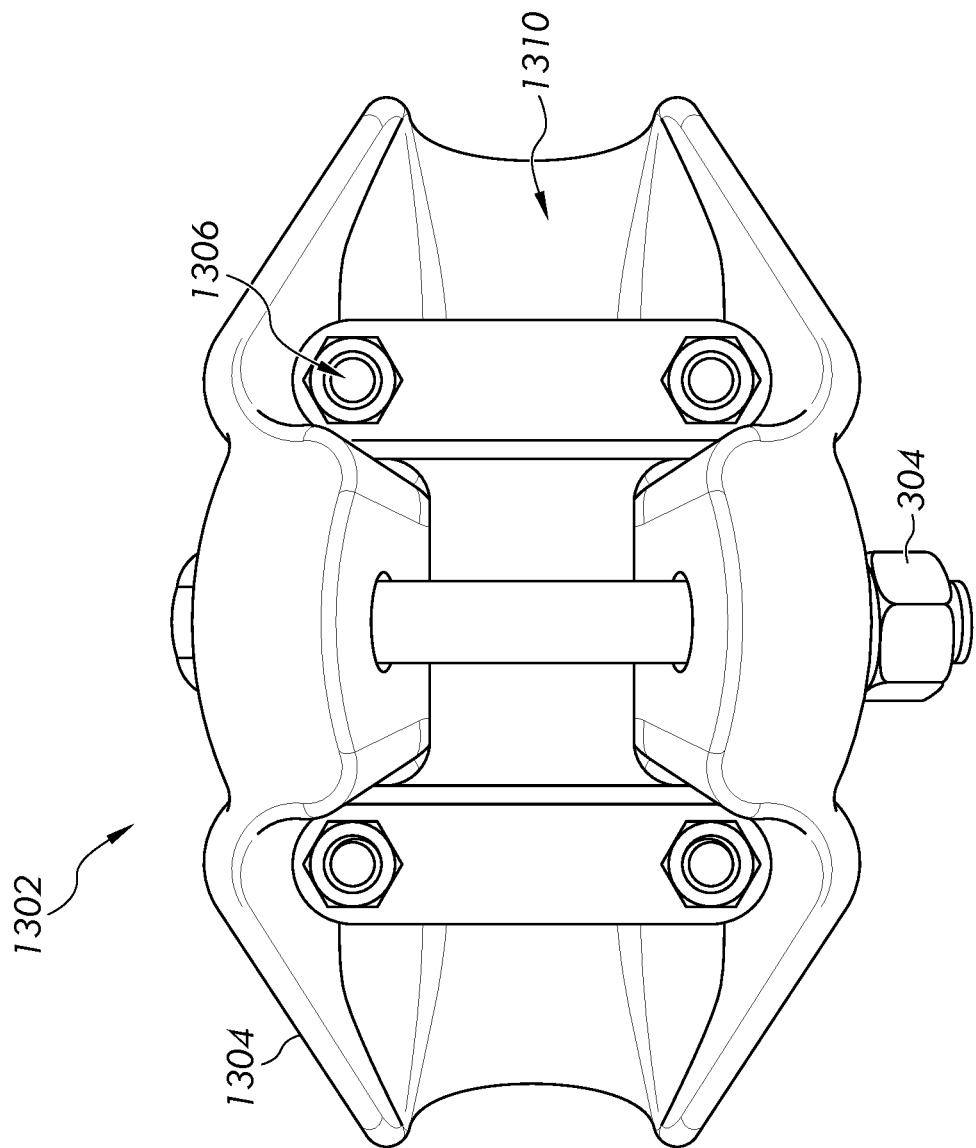
FIG. 13 is an illustration of an example clamp.

Referring to FIG. 3, the housing 202 can also include a suspending region 302 that is adapted to receive an associated support element 304 (shown as a nut and bolt in FIG. 13). As shown in FIG. 3, the suspending region can include a generally vertical wall 306 that defines apertures 308. In an example, the associated support element 304 (shown in FIG. 13) can be a bolt that passes through the apertures 308 and cooperates with other support structure such as an insulator that is attached to the tower 106 (shown in FIG. 1).

Figure 4:
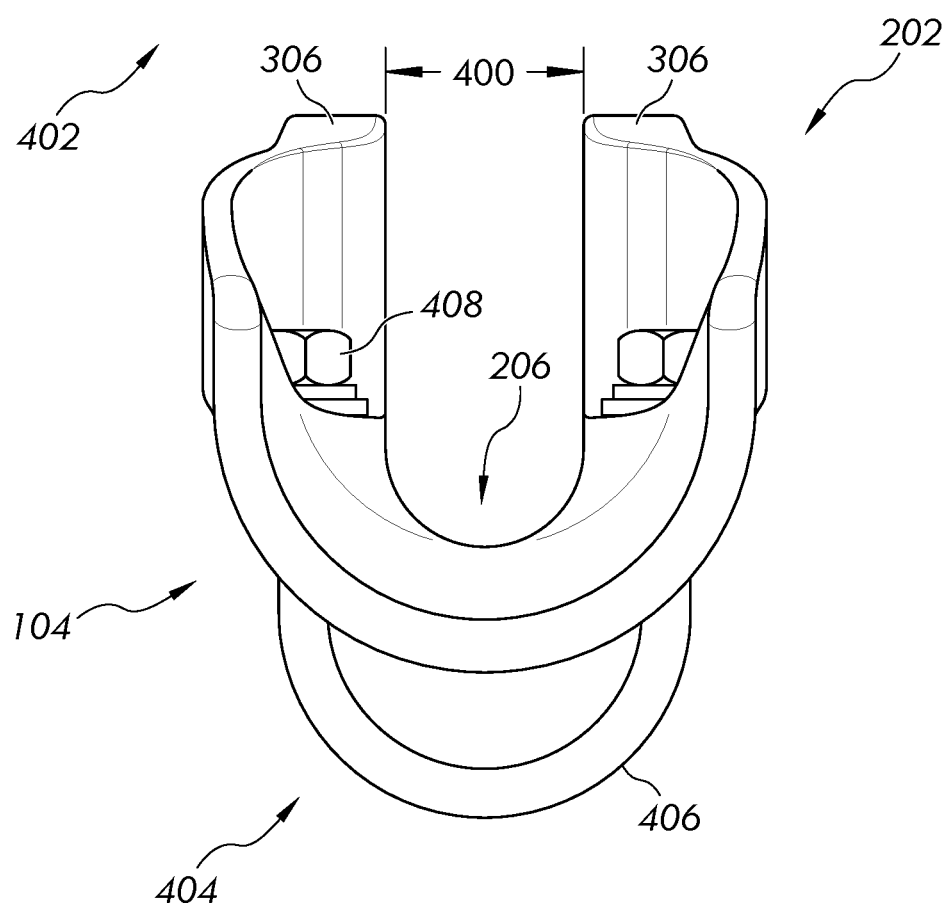
FIG. 4 is an illustration of an example clamp.

Referring to FIG. 4, an end view of the housing 202 is shown. It is to be appreciated that the generally vertical walls 306 can be separated by a distance 400 such that the wire 102 can pass from a space 402 external to the housing 202 to the wire receiving region 206.

The clamp 104 further includes a fastening unit 404. The fastening unit 404 includes a first fastener 406, which can be a U-bolt. The fastening unit 404 also includes a second fastener 408 that is attachable to the first fastener 406. In an example, the second fastener 408 can be a nut that is configured to thread onto a threaded portion of the first fastener 406. In some examples, the fastening unit 404 can also include washers, lock washers, etc. in order to provide a reliable and repeatable connection between the wire 102 and the clamp 104.

Figure 5:
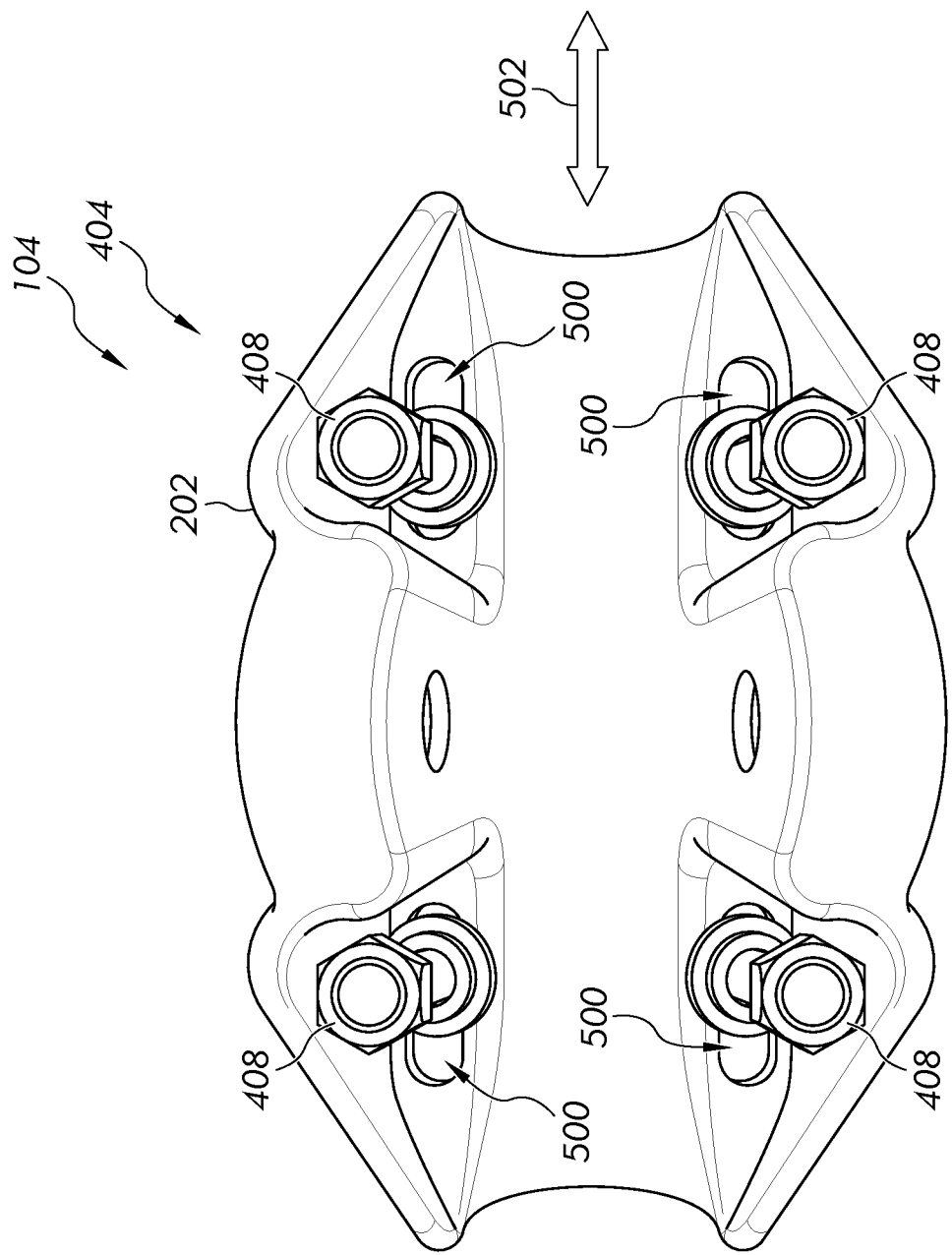
FIG. 5 is an illustration of an example clamp.

Referring to FIG. 5, the housing 202 is illustrated in a top view. The housing 202 defines an opening 500 extending in a direction 502 along which the wire 102 is received within the housing 202. Before the second fastener 408 is attached to the first fastener 406, the first fastener 406 passes through the opening 500. In the shown example, an assembler would place the first fastener 406 (e.g., the U-bolt) ends through two of the openings 500 to pass threaded ends of the first fastener 406 through a portion of the housing 202. The second fastener 408 (e.g., the nuts) is then attached to the first fastener 406. After the second fastener 408 is attached to the first fastener 406, the fastening unit 404 is not removable from the housing 202.

Figure 6:
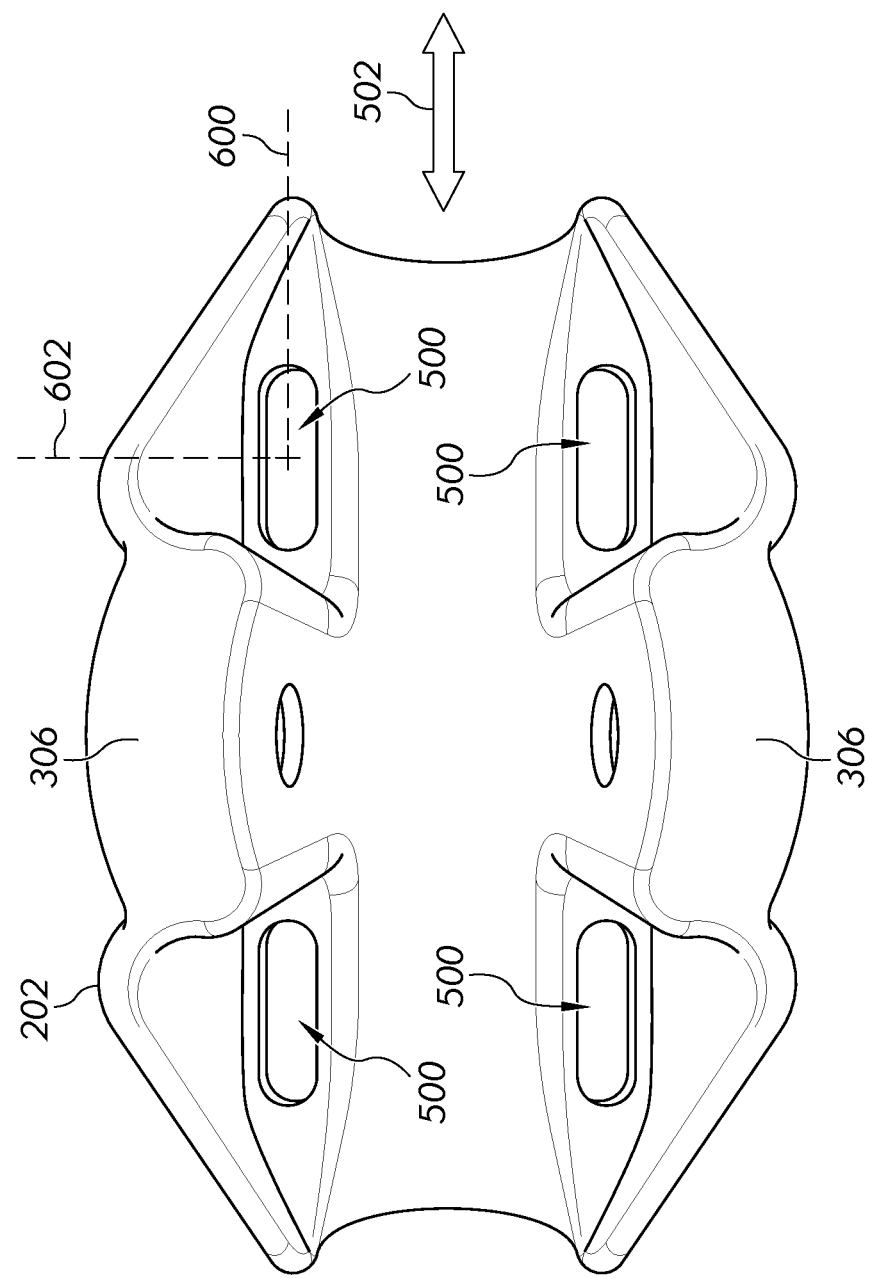
FIG. 6 is an illustration of an example clamp.

Referring to FIG. 6, the housing 202 is illustrated in a top view without the fastening unit 404 in place. In an example, the openings 500 can be stadium-shaped, that is, defined by a central rectangular shape with two semi-circles at either end of the rectangle. In an example, the openings 500 can include a major axis 600 and a minor axis 602 such that the major axis is oriented in the same direction 502 along which the wire 102 is received within the housing 202. Of course, other configurations of the openings 500 are also contemplated. Regardless of the shape of the opening 500, after the second fastener 408 is attached to the first fastener 406, the fastening unit 404 is movable, within the opening 500. More particularly, the fastening unit 404 is movable within the opening 500 between a first position relative to the housing 202 and a second position relative to the housing 202. In an example, the openings 500 can be key holed-shaped such that the fastening unit 404 can be inserted into the opening 500 while the second fastener 408 is attached to the first fastener 408.

Figure 7:
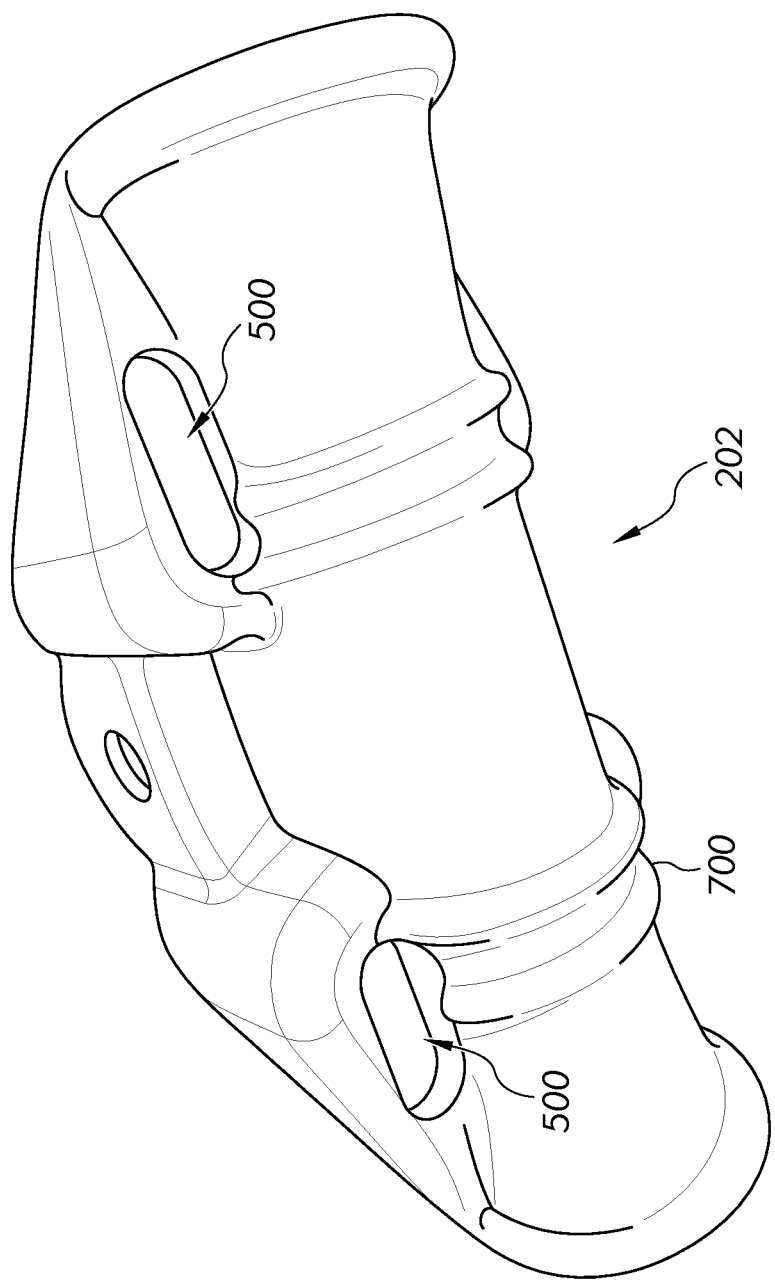
FIG. 7 is an illustration of an example clamp.

Referring to FIG. 7, the housing 202 can also include ridges 700 that can be used to locate the first fastener 406 at such time when the second fastener 408 is threaded onto the first fastener 406 to a tightened position. As can be appreciated from the view in FIG. 7, the fastening unit 404 can be moved from a first position relative to the housing 202 and a second position relative to the housing 202. This is true even when the first fastener 406, is passed through the opening 500 and is engaged with the second fastener 408. The perimeter of the opening 500 enables the fastening unit 404 to move within the confines of the opening 500. In an example, the first fastener 406 translates between the first position and the second position. Given the shown example of the opening extending in a direction parallel to the direction 502 the wire 102 is received within the housing 202, the fastening unit 404 can translate along the direction 502. In an example, the fastening unit 404 can rotate between the first position and the second position. For example, the U-bolt can rotate from its position within the ridges 700 until a portion of the legs of the U-bolt encounter the edge of the opening 500.

Figure 8:
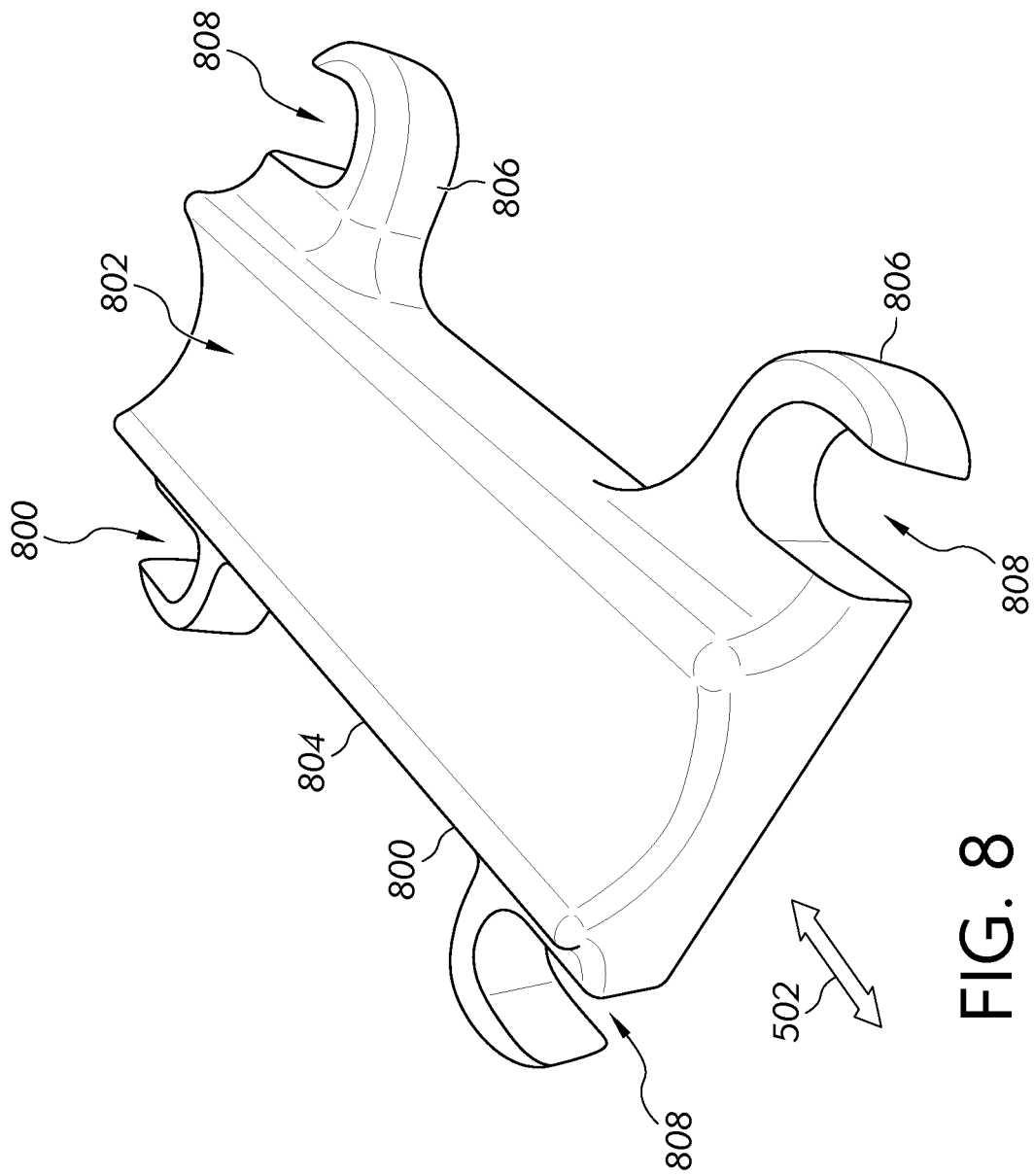
FIG. 8 is an illustration of an example clamp.

Referring to FIG. 8, the clamp 104 further includes a keeper 800. The keeper 800 functions as a movable upper surface of the wire receiving region 206. In the example, the wire 102 is disposed between the inner support surface 204 and the keeper 800 when the wire 102 is suspended by the clamp 104. As shown in FIG. 8, a surface 802 of the keeper 800 can include a curved profile that can include a radius or other curved surface. The radius or other curved surface can help ensure that the surface 802 provides a relatively large area of surface contact with the wire 102. In an example, the curve of the surface 802 can be similar or the same as the inner support surface 204.

The keeper 800 includes a main body 804 and an arm 806. Furthermore, the keeper 800 defines a second opening 808 extending in the direction 502 along which the wire is received within the housing 202. In an example, the second opening 808 is defined by the arm 806. The second opening 808 permits a portion of the first fastener 406 to pass through a portion of the keeper 808. In other words, the arm 806 can be passed around a leg of first fastener 406 such that the portion of the first fastener 406 passes through a portion of the keeper 800 (e.g., the arm 806).

In the described examples, when the fastening unit 404 is located at the first position, the fastening unit 404 cooperates with the keeper 800 to decrease a distance between the inner support surface 204 and the keeper 800 to facilitate the keeper 800 maintaining the wire 102 within the clamp 104. In the first position, the fastening unit 404 includes a portion of the first fastener 406 that passes through a portion of the keeper 800. As desired, the second fastener 408 can be tightened, threaded, etc. to the first fastener 406 in order to decrease the distance between the inner support surface 204 and the keeper 800. It is to be appreciated that during the assembly of a power network, the wire 102 can be placed in the housing 202, and then the keeper 800 is placed on top of the wire 102 while the fastening unit 404 is in the second position. When the fastening unit 404 is located at the second position, the fastening unit 404 does not cooperate with the keeper 800 to decrease the distance between the inner support surface 204 and the keeper 800. The fastening unit 404 can then be moved to the first position where the second fastener 408 is then tightened, threaded, etc. to the first fastener 406 to secure the wire 102 to the clamp 104.

As such, the keeper 800 is detachable from the fastening unit 404 before the second fastener 408 is attached to the first fastener 406. Additionally, the keeper 800 is detachable from the fastening unit 404 after the second fastener 408 is attached to the first fastener 406. This is because the fastening unit 404 can be moved from the first position of engagement with the keeper 800 to the second position of non-engagement with the keeper 800 as needed.

Figure 9:
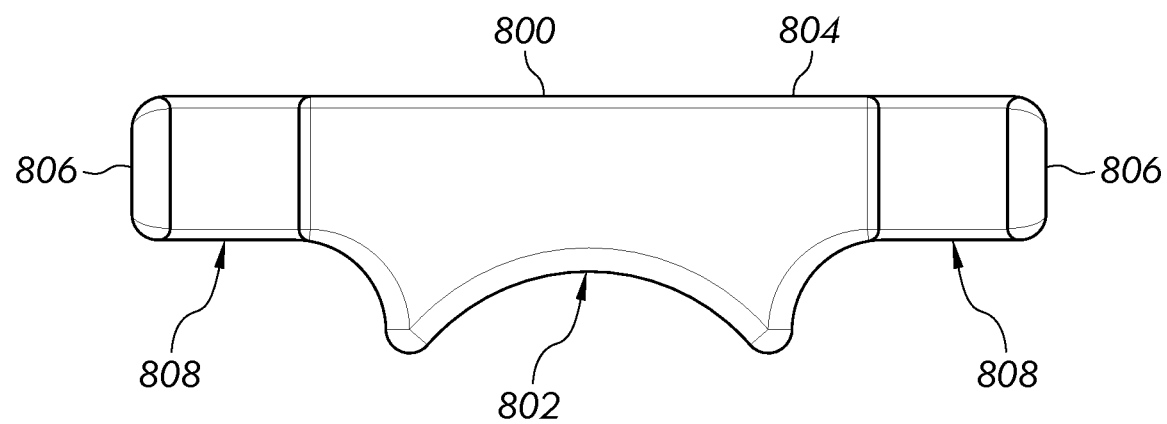
FIG. 9 is an illustration of an example clamp.

Referring to FIG. 9, the keeper 800 is shown in an end view. As was previously discussed, the keeper 800 includes the surface 802 of the keeper 800 having a curved profile that can include a radius or other curved surface.

Returning to FIG. 8, the combination of the keeper 800 defining a second opening 808 extending in the direction 502 along which the wire is received within the housing 202 and the fastening unit 404 being movable between two positions can be beneficial when hanging a wire from a set of poles or towers. This is because the fastening unit 404 can be attached to the housing 202 of the clamp 104 while all of the components of the fastening unit 404 are already secured to the housing. In other words, there are no separate or loose parts than can be relatively easily lost, separated, or dropped to the ground. When the operator is tens or hundreds of feet in the air, losing and dropping fasteners is undesirable and can unnecessarily increase the time and cost of assembly. Additionally, the feature of the fasteners connected together prior to assembly work on the wire can simplify the assembly work and reduce the time required for other clamp device assemblies. For example, some clamp assemblies can include ten or more individual parts requiring assembly while in the air, while the present disclosure describes a clamp 104 having two subassemblies requiring attachment to each other.

Figure 10:
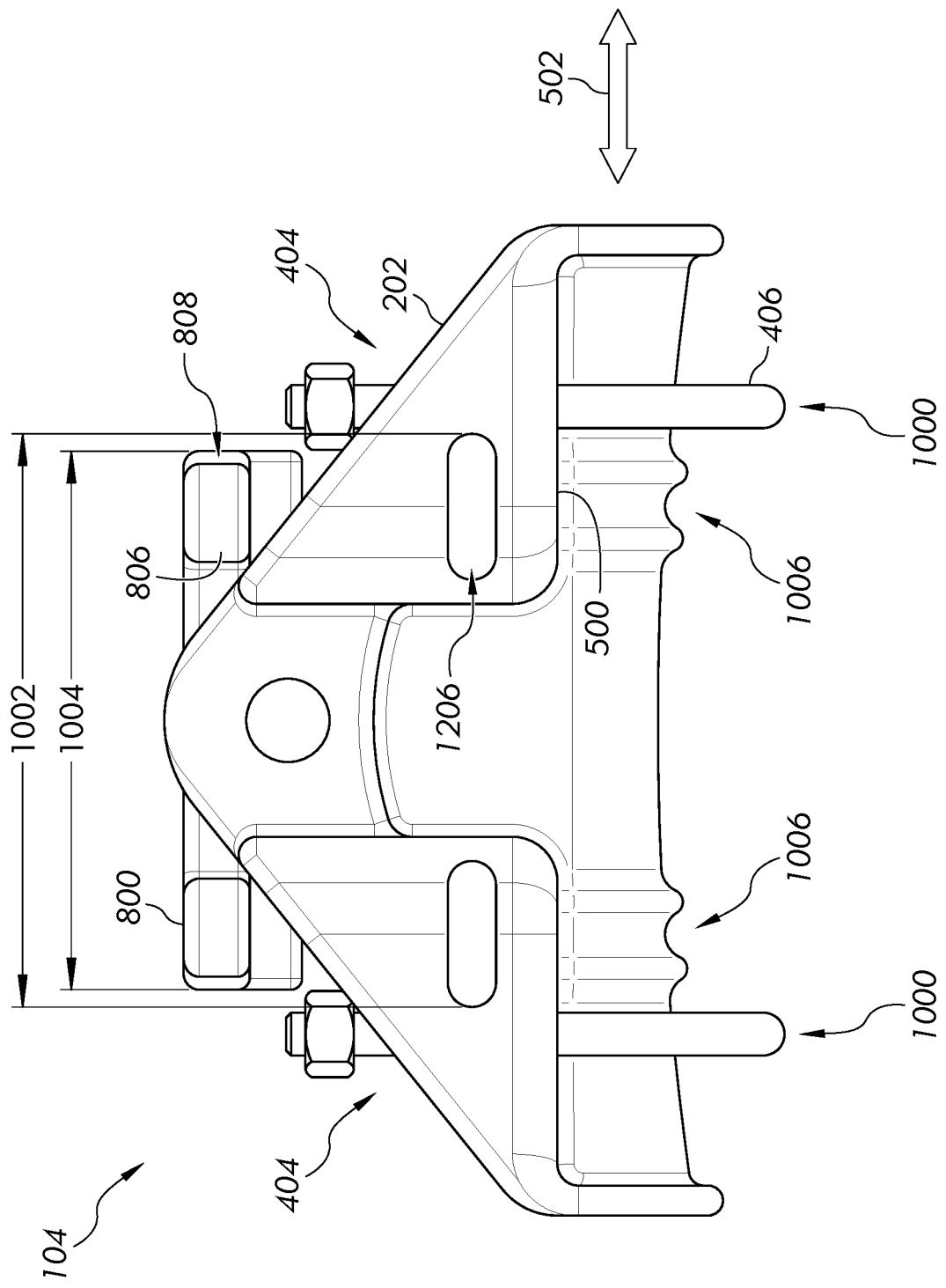
FIG. 10 is an illustration of an example clamp.

Referring to FIG. 10, a brief description of an example process of attaching the keeper 800 to the housing 202 is provided. As shown, the first fastener 406 is attached to the second fastener 408 to make the fastening unit 404 as would be the case when a line worker is placing the clamp in an overhead power line environment 100 to support a wire 102 a distance above the ground. As such, the clamp 104 will typically be in only two individual subassemblies each time the line worker places the clamp 104 into service. The line worker can laterally move or translate the fastening unit 404 from any position within the opening 500 to the second position, represented by the fastening unit 404 located at arrow 1000. The second position 1000 may be considered a position away from the center of the housing 202 in direction 502 along which the wire 102 is received within the housing 202.

Once the wire 102 is located within the housing 202, the line worker can then place the keeper 800 into a position such that the surface 802 contacts an upper surface of the wire 102. In the shown example, when the two fastening units 404 are in the second position 1000, the distance 1002 is wider than a length of the keeper 1004. As such, the keeper 800 can be moved freely into position in contact with the wire 102. Then, the line worker can move both fastening units 404 from their respective second positions 1000 to their respective first positions (e.g., a position relatively closer to the center of the housing 202 than the second position 1000 in the direction 502 along which the wire 102 is received within the housing 202).

The fastening unit 404 can easily pass from the second position 1000 to the first position (represented by arrow 1006) because the second opening 808 extends in the direction 502 along which the wire is received within the housing 202, and the second opening 808 is not defined by a fully enclosed perimeter (e.g., the second opening 808 is open to the space at the ends of the arms 806. As previously noted, when in the first position 1006, the fastening unit 404 includes a portion of the first fastener 406 that passes through a portion of the keeper 800. In the shown example, the first fastener 406 passes through a portion of the arm 806 facilitated by the second opening 808. As desired, the second fastener 408 can be tightened, threaded, etc. to the first fastener 406 in order to decrease the distance between the inner support surface 204 and the keeper 800. The line worker can use a powered device to secure the second fastener 408 to the first fastener 406. It is to be understood that other examples are also contemplated. For example, the fastening unit 404 may be simply rotated about a point on the exterior of the housing 202 in order to move to the second position 1000, thus providing an adequate distance for the keeper 800 to be placed into position. The fastening units 404 can then be rotated to the first position 1006 for proper tightening.

Figure 11:
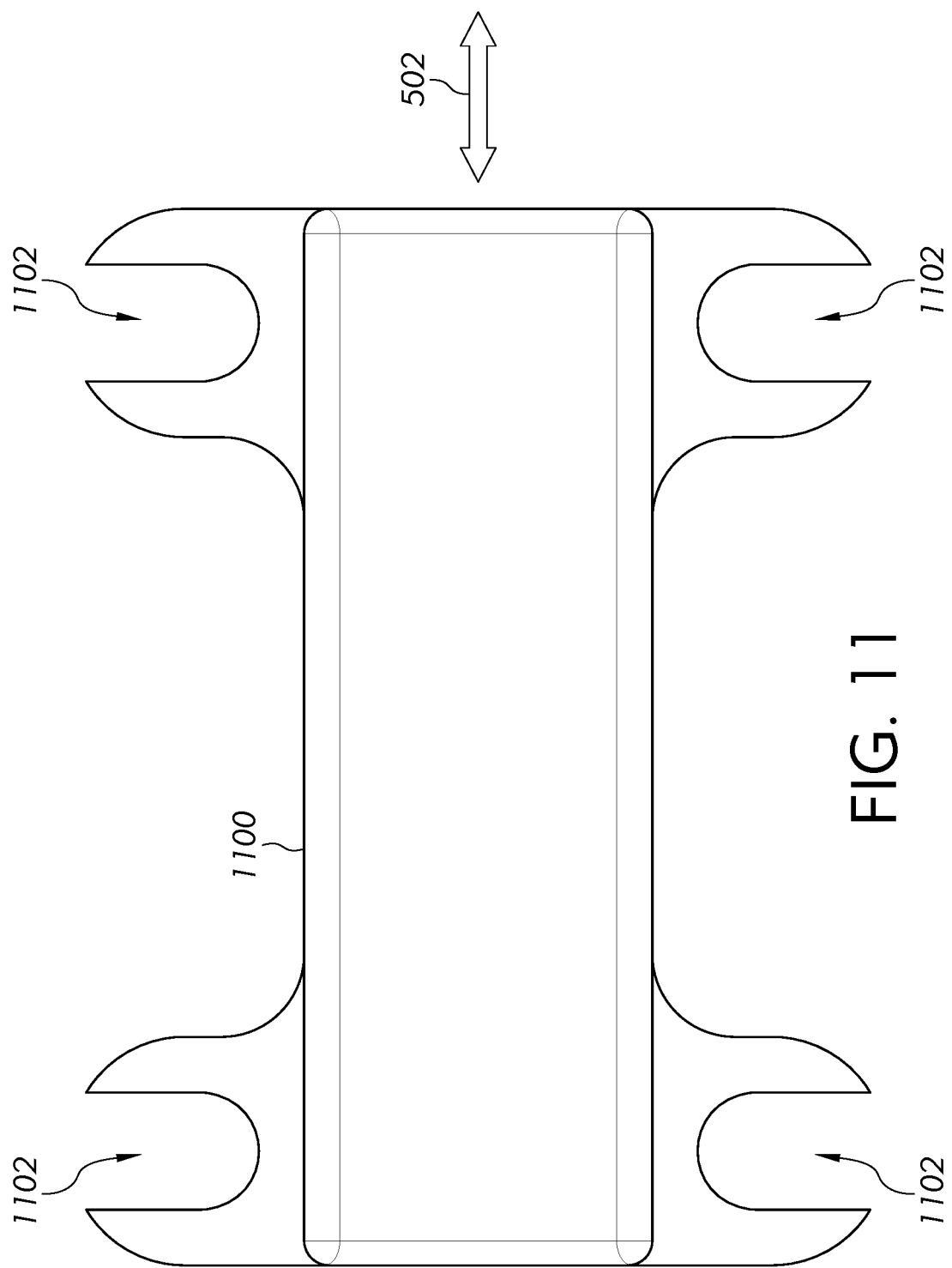
FIG. 11 is an illustration of an example clamp.

Referring to FIG. 11, an example keeper 1100 is shown in bottom view. The keeper 1100 defines a second opening 1102 to receive the first fastener 406. The second opening 1102 extends in a direction non-parallel to the direction 502 along which the wire 102 is received within the housing 202.

Similar to the previous example keeper 800 and housing 202, the first fastener 406 can be a U-bolt. In this example, when the first fastener 406 is received within the second opening 1102, the fastening unit 404 cooperates with the keeper 1100 to decrease a distance between the inner support surface 204 and the keeper 1100 to facilitate the keeper 1100 maintaining the wire 102 within the clamp 104.

As with the first example clamp 104, the keeper 1100 is detachable from the fastening unit 404 before the second fastener 408 is attached to the first fastener 406. Additionally, the keeper 1100 is detachable from the fastening unit 404 after the second fastener 408 is attached to the first fastener 406.

Figure 12:
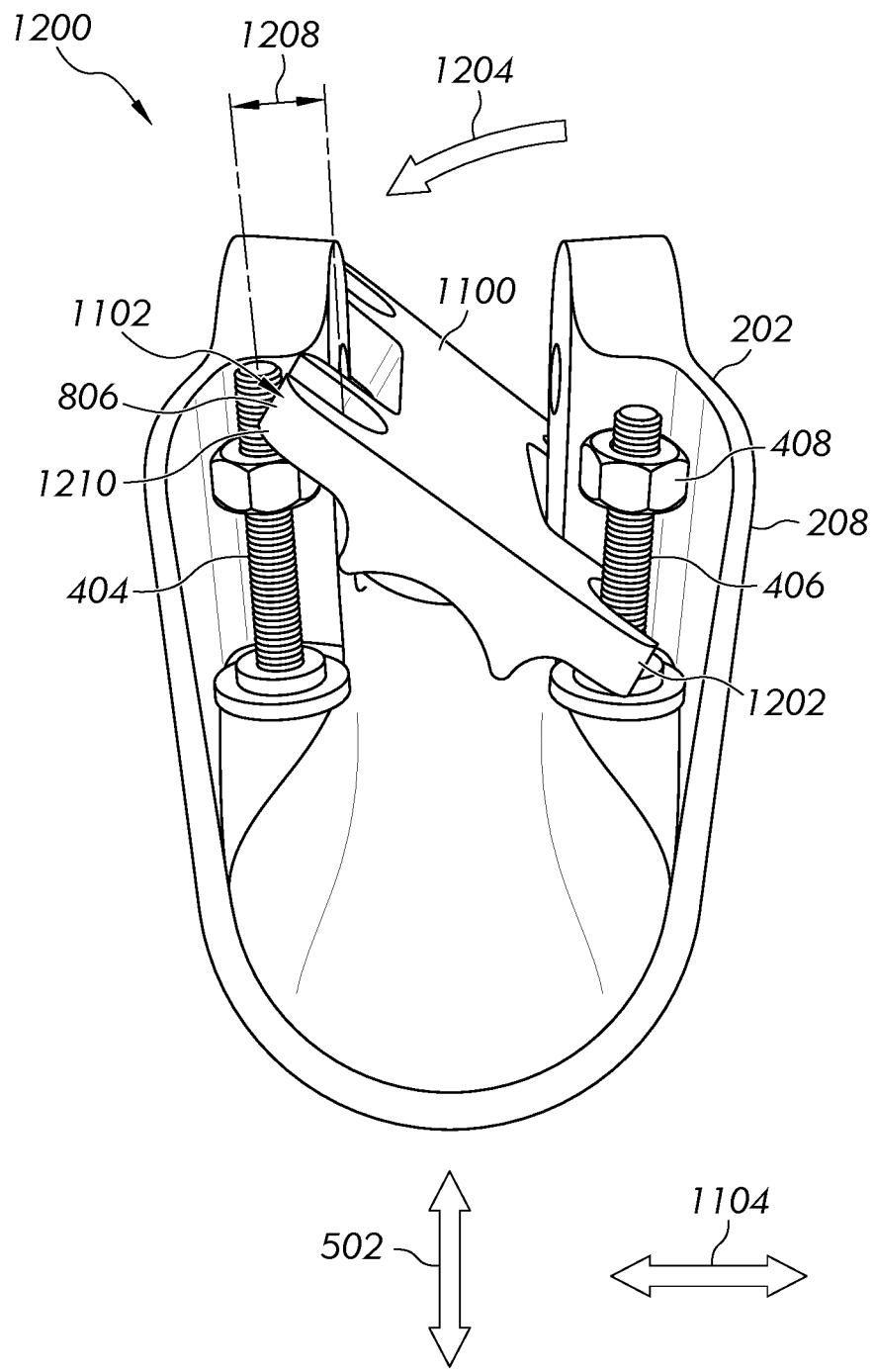
FIG. 12 is an illustration of an example clamp.

Referring to FIG. 12, a brief description of an example process of attaching the keeper 1100 to the housing 202 is provided. As previously discussed, in an example, the second opening 1102 extends in a direction 1104 that is non-parallel to the direction 502 along which the wire 102 is received within the housing 202. In a more particular example, the direction 1104 is perpendicular to the direction 502 along which the wire 102 is received within the housing 202.

As shown, the first fastener 406 is attached to the second fastener 408 to make the fastening unit 404 as would be the case when a line worker is placing the clamp in an overhead power line environment 100 to support a wire 102 a distance above the ground. As such, the clamp 1200 will typically be in only two individual subassemblies each time the line worker places the clamp 1200 into service. In this example, the line worker may not need to move or translate the fastening unit 404 from any position. Instead, the line worker can move the keeper 1100 toward the housing 202 at an angle, and then move the keeper 1100 such that the first fasteners 406 of one side of the clamp 1200 pass into the second opening 1102 defined by the keeper 1100 on the same side. The line worker can then urge the keeper 1100 to a position corresponding to the fastening unit 404 positioned relatively close to a closed end of the second opening 1102, represented by arrow 1202. At this time, the line worker can then rotate the keeper 1102 according to arrow 1204 in order to engage the second openings 1102 of the opposite side of the keeper 1100 with the fastening units 404 on the opposite side of the clamp 1200. As desired, the second fastener 408 can be tightened, threaded, etc. to the first fastener 406 in order to decrease the distance between the inner support surface 204 and the keeper 800. The line worker can use a powered device to secure the second fastener 408 to the first fastener 406.

Returning to FIG. 10, in an example, the housing 202 defines a third opening 1206. The third opening 1206 is defined by a perimeter that encloses an area larger than a portion of the keeper 1100 to permit a portion of the keeper 1100 to pass through a portion of the housing 202. Returning to FIG. 12, in the shown example, the third opening 1206 permits a portion of the arm 806 to pass through the vertical wall 208 of the housing 202. This feature enables one side of the keeper 1100 to be positioned closer to the center of the housing 202 in order to provide a greater clearing distance 1208 between the end 1210 of the arm 806 and the fastening unit 404. In some cases, the greater clearing distance 1208 enables the keeper 1100 to pass by the fastening unit 404 when it is placed into position to grip the wire 102. This arrangement may necessitate a longer second opening 1102 in the arm 806.

Referring to FIG. 13, an example clamp 1302 is shown in a top view. In this example, the housing 1304 is similar to the housing 202, however, the opening 1306 is not necessarily elongated. The opening 1306 can be circular in cross section. As with the previous example, the wire 102 rests on an inner support surface 1310 of the housing 1304 when the wire 102 is suspended by the clamp 1302.

Figure 14:
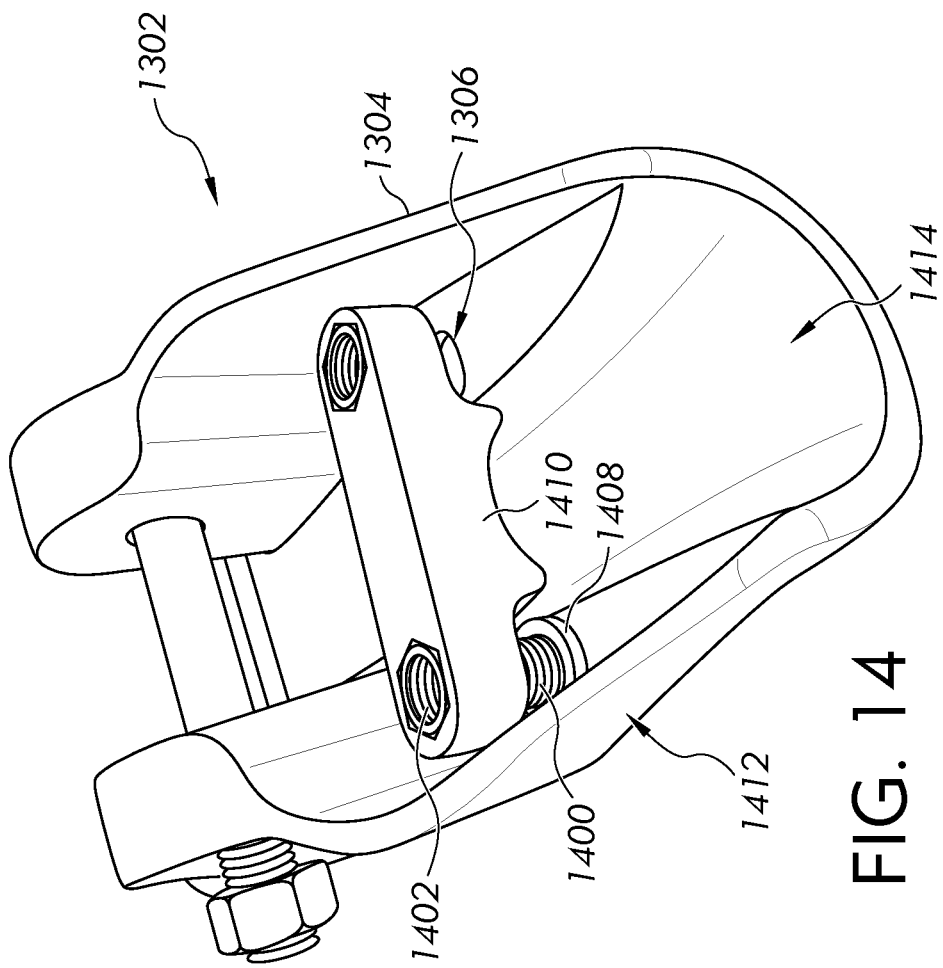
FIG. 14 is an illustration of an example clamp.

Referring to FIG. 14, the first fastener 1400 is attached to the housing 1304 when the second fastener 1402 is attached to the first fastener 1400. Additionally, the first fastener 1400 is attached to the housing 1304 when the second fastener 1402 is not attached to the first fastener 1400. In the shown example, the first fastener 1400 is a machine screw and the second fastener 1402 is a nut. The first fastener 1400 remains attached to the housing 1304 regardless of whether the first fastener 1400 is attached to the second fastener 1402. This is because a fastener keeper 1408 (e.g., an elastomeric gasket) is placed around the shaft of the first fastener 1400. In an example, the fastener keeper 1408 can be a washer that grips the shaft of the first fastener 1400 and is of greater diameter than the opening 1306. In a more specific example, the fastener keeper 1408 is a rubber washer that has an inside diameter that is of lesser length than an outside diameter of the first fastener 1400. The difference in diameters creates a force between the fastener keeper 1408 and the first fastener 1400 that is not overcome by typical movement of the clamp 1302 such as jostling during movement of the clamp 1302, etc. This arrangement prevents passage of the first fastener 1400 through the opening 1306 whether or not the first fastener 1400 is secured to the nut.

As can also be seen in FIG. 14, the second fastener 1402 is attached to the keeper 1410 when the second fastener 1402 is attached to the first fastener 1400. Additionally, the second fastener 1402 is attached to the keeper 1410 when the second fastener 1402 is not attached to the first fastener 1400. In the shown example, the second fastener 1402 (e.g., the nut) is press fit into the keeper 1410. In other examples, the second fastener 1402 (e.g., the nut) is attached to (e.g., press fit into) the housing 1304 and the first fastener 1400 passes through the keeper 1410 without affecting the operation of the clamp 1302. As such, the first fastener 1400 can be attached to at least one of the housing 1304 or the keeper 1410 when the second fastener 1402 is attached to the first fastener 1400. Additionally, the first fastener 1400 can be attached to at least one of the housing 1304 or the keeper 1410 (e.g., via the fastener keeper 1408) when the second fastener 1402 is not attached to the first fastener 1400. In other words, regardless of whether the first fastener 1400 is attached to the second fastener 1402, the first fastener is attached to either the housing 1304 or the keeper 1410 (e.g., via the fastener keeper 1408), and the second fastener 1402 is attached to either the keeper 1410 or the housing 1304.

Similarly, the second fastener 1402 is attached to at least one of the keeper 1410 or the housing 1304 when the second fastener 1402 is attached to the first fastener 1400. Additionally, the second fastener 1402 is attached to (e.g., integral with, press fit into, etc.) at least one of the keeper 1410 or the housing 1304 when the second fastener 1402 is not attached to the first fastener 1400. In other words, the second fastener 1402 is attached to either the housing 1304 or the keeper 1410 regardless of whether the second fastener 1402 is attached to the first fastener 1400.

Similar to the first example clamp 104, the fastening unit 1412 cooperates with the keeper 1410 to decrease a distance between the inner support surface 1414 and the keeper 1410 to facilitate the keeper 1410 maintaining the wire 102 within the clamp 1302.

Figure 15:
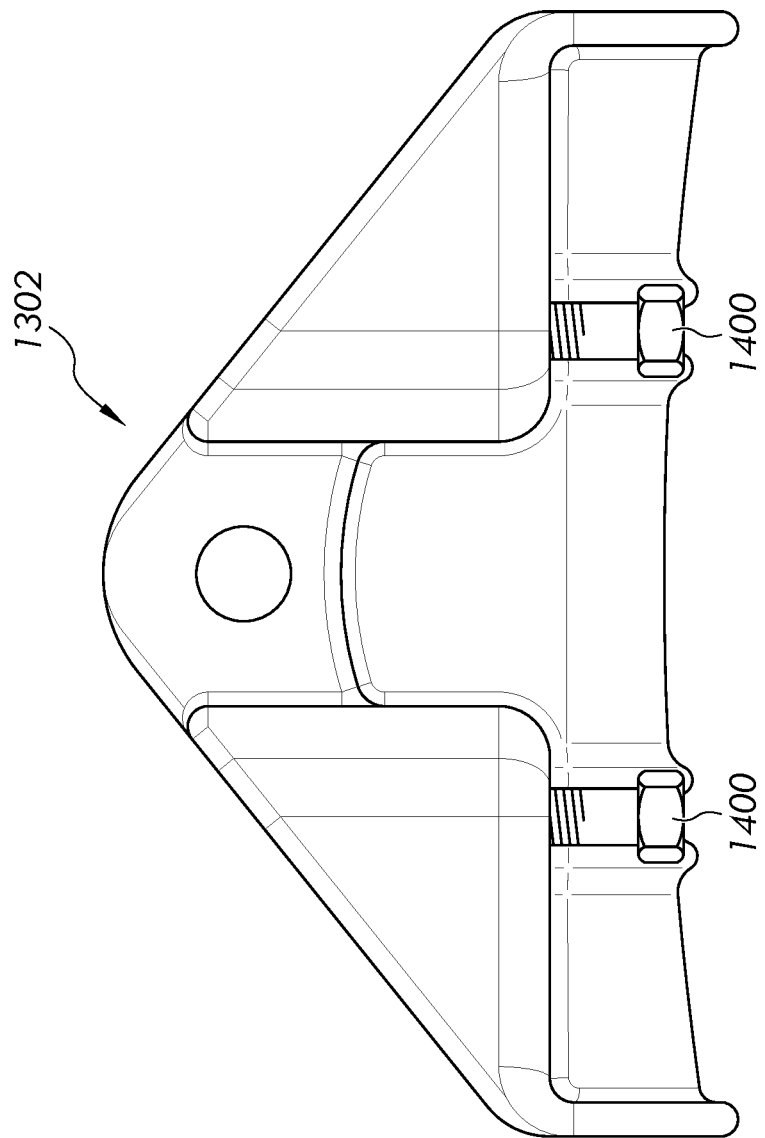
FIG. 15 is an illustration of an example clamp.

Referring to FIG. 15, a side view of the example clamp 1302 is illustrated to better show the location of first fasteners 1400.

Figure 16:
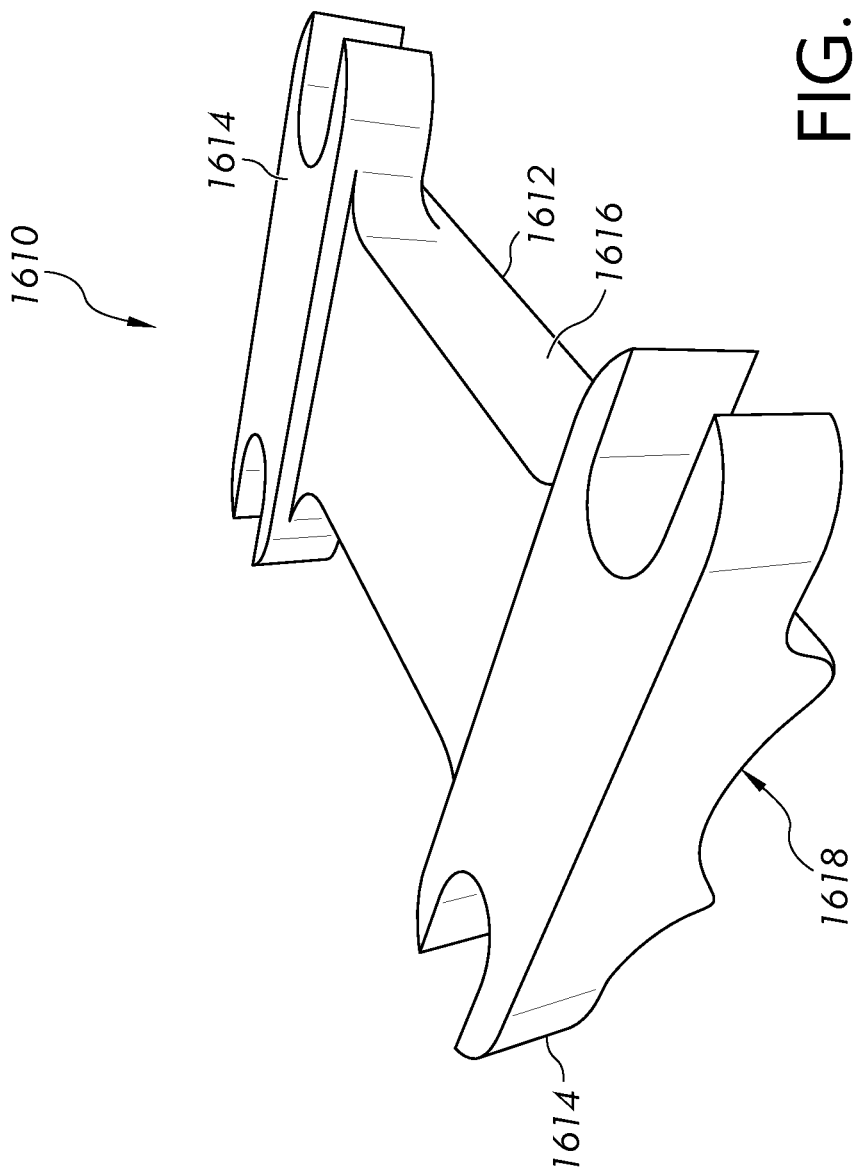
FIG. 16 is an illustration of an example clamp.

Referring to FIG. 16, an example keeper is used as an example that can apply to any of the keepers previously described in this disclosure. The keeper 1610 includes a main body 1612 and an arm 1614. In the shown example, the arm 1614 extends from the main body 1612 at a transverse angle to a side 1616 of the main body 1612. In a particular example, the arm 1614 extends from the main body 1612 at a right angle to the side 1616 of the main body 1612. After the wire 102 is located within the clamp 1302, and the keeper 1610 is secured to the housing 1304 with a fastening unit, each of the arms 1614 can be subjected to a relatively high amount of bending stress that can result in permanent deformation of the arm 1614.

In an example, permanent deformation of the arm 1614 can be reduced or eliminated by designing and manufacturing the keeper 1610 such that a material of the main body 1612 differs from a material of the arm 1614. In this example, the material of the arm 1614 has a greater yield strength than the material of the main body 1612. The greater yield strength of the arm 1614 helps reduce and/or eliminate permanent deformation of the arm 1614 during the application of a fastening unit. In a particular example, the material of the main body 1612 is aluminum and the material of the arm 1614 is a ferrous alloy such as steel. It is to be understood that the higher yield strength of the steel will include greater resistance to permanent deformation at any given fastener loading when compared to aluminum.

Any suitable manufacturing process may be used to construct the keeper 1610. In an example, the arms 1614 can be manufactured separately from the main body 1612 and then press-fit together with the main body 1612 to form the keeper 1610. For example, an aluminum main body 1612 may include tabs that are press fit into the ferrous alloy arms 1614 with an arbor press or other devices. In other examples, the aluminum main body 1612 can be cast into or around the steel arms. In the examples of the keeper 1610 having the arms 1614 comprising a ferrous alloy and the main body 1612 comprising an aluminum alloy, the assembled configuration of the keeper 1610 can be such that the steel arm 1614 does not form part of the surface 1618 of the keeper 1610.

In many examples, the wire 102 is formed of aluminum, and there can be several benefits to having the surface 1618 of the keeper 1610 and the wire 102 be the same material (e.g., aluminum). In an example, the aluminum material of the main body 1612 of the keeper 1610 is less abrasive than other materials such as ferrous materials. A less abrasive keeper 1610 helps protect the wire 102 by promoting less wear on the wire 102, thus increasing the service life of the wire 102. The main body 1612 and the wire 102 being the same material also promote a similar wear rate between the main body 1612 and the wire 102.

Another benefit can include a relatively high corrosion resistance, particularly in comparison to assemblies having dissimilar metals composing the wire 102 and the components of the clamp 1302. Other benefits can include decreased eddy current potential and decreased levels of inductive heating when compared to assemblies having dissimilar metals composing the wire 102 and the components of the clamp 1302.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A clamp for suspending a wire, comprising:
   a housing, wherein the wire rests on an inner support surface of the housing when the wire is suspended by the clamp;
   a keeper, wherein the wire is disposed between the inner support surface and the keeper when the wire is suspended by the clamp; and
   a fastening unit, comprising:

a first fastener; and a second fastener attachable to the first fastener, wherein:

the housing defines an opening extending in a direction along which the wire is received within the housing, and after the second fastener is attached to the first fastener, the fastening unit is movable, within the opening, between a first position relative to the housing and a second position relative to the housing, wherein:

when the fastening unit is located at the first position, the fastening unit cooperates with the keeper to decrease a distance between the inner support surface and the keeper to facilitate the keeper maintaining the wire within the clamp, and when the fastening unit is located at the second position, the fastening unit does not cooperate with the keeper to decrease the distance.

2. The clamp of claim 1, wherein the keeper is detachable from the fastening unit before the second fastener is attached to the first fastener and the keeper is detachable from the fastening unit after the second fastener is attached to the first fastener.

3. The clamp of claim 1, wherein the opening includes a major axis and a minor axis, the major axis being parallel with the direction along which the wire is received within the housing.

4. The clamp of claim 3, wherein the U-bolt translates between the first position and the second position.

5. The clamp of claim 4, wherein the first fastener is a U-bolt and the second fastener is a nut.

6. The clamp of claim 1, wherein before the second fastener is attached to the first fastener, the first fastener passes through the opening, and after the second fastener is attached to the first fastener, the fastening unit is not removable from the housing.

7. The clamp of claim 1, wherein the housing further comprises a generally horizontal surface that is located above the inner support surface and the generally horizontal surface defines the opening.

8. The clamp of claim 1, wherein the housing further comprises a ridge to locate the first fastener.

9. The clamp of claim 1, wherein the keeper defines a second opening extending in the direction along which the wire is received within the housing.

10. The clamp of claim 9, wherein the second opening permits a portion of the first fastener to pass through a portion of the keeper.

11. The clamp of claim 1, wherein the keeper comprises a main body and an arm, wherein a material of the main body differs from a material of the arm.

12. The clamp of claim 11, wherein the material of the arm has a greater yield strength than the material of the main body.

13. The clamp of claim 12, wherein the material of the main body is aluminum and the material of the arm is a ferrous alloy.

14. A clamp for suspending a wire, comprising:

a housing, wherein the wire rests on an inner support surface of the housing when the wire is suspended by the clamp;

a keeper, wherein the wire is disposed between the inner support surface and the keeper when the wire is suspended by the clamp; and a fastening unit, comprising:

a first fastener; and a second fastener attachable to the first fastener, wherein:

the housing defines an opening, the keeper defines a second opening to receive the first fastener, when the first fastener is received within the second opening the fastening unit cooperates with the keeper to decrease a distance between the inner support surface and the keeper to facilitate the keeper maintaining the wire within the clamp, the keeper is detachable from the fastening unit before the second fastener is attached to the first fastener, and the keeper is detachable from the fastening unit after the second fastener is attached to the first fastener.

15. The clamp of claim 14, wherein the keeper further comprises a main body and an arm.

16. The clamp of claim 14, wherein the second opening permits a portion of the first fastener to pass through a portion of the keeper.

17. The clamp of claim 14, wherein the housing defines a third opening to permit a portion of the keeper to pass through a portion of the housing.

18. The clamp of claim 14, wherein before the second fastener is attached to the first fastener, the first fastener passes through the opening, and after the second fastener is attached to the first fastener, the fastening unit is not removable from the housing.

19. The clamp of claim 14, wherein the second opening extends in a direction non-parallel to a direction along which the wire is received within the housing.

20. A clamp for suspending a wire, comprising:

a housing, wherein the wire rests on an inner support surface of the housing when the wire is suspended by the clamp;

a keeper, wherein the wire is disposed between the inner support surface and the keeper when the wire is suspended by the clamp; and a fastening unit, comprising:

a first fastener; and a second fastener attachable to the first fastener, wherein:

the first fastener is attached to at least one of the housing or the keeper when the second fastener is attached to the first fastener, the first fastener is attached to at least one of the housing or the keeper when the second fastener is not attached to the first fastener, the second fastener is attached to at least one of the keeper or the housing when the second fastener is attached to the first fastener, the second fastener is attached to at least one of the keeper or the housing when the second fastener is not attached to the first fastener, and the fastening unit cooperates with the keeper to decrease a distance between the inner support surface and the keeper to facilitate the keeper maintaining the wire within the clamp.

* * * * *